United States Patent Office 3,439,747
Patented Apr. 22, 1969

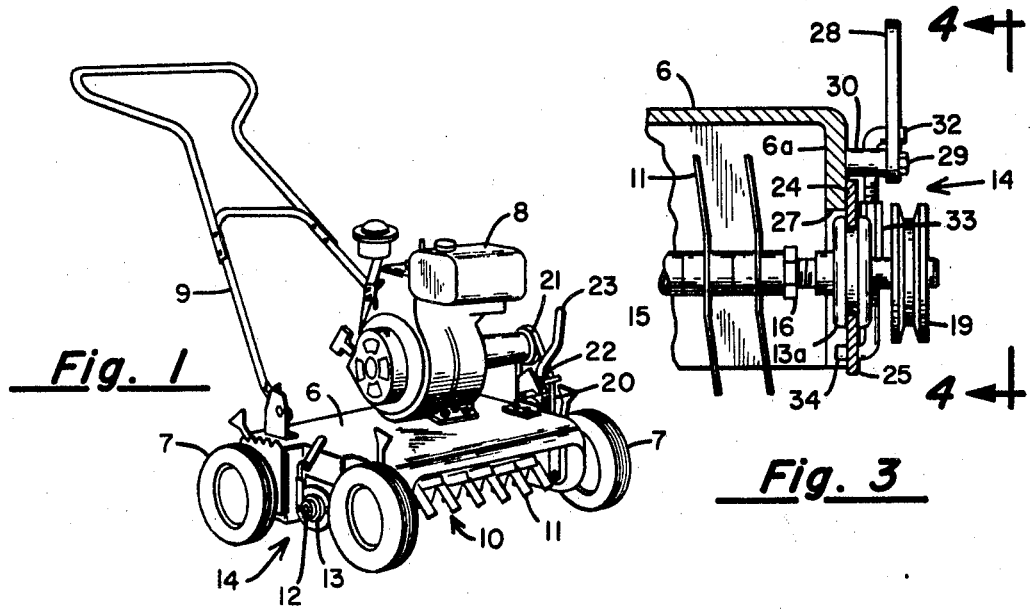
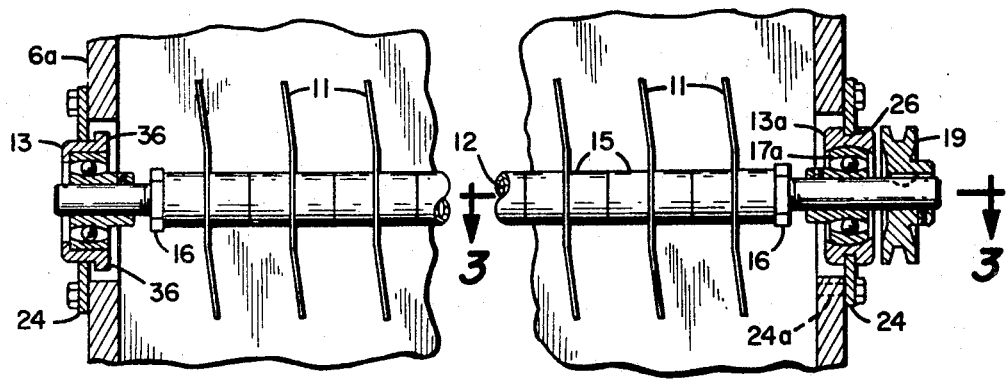
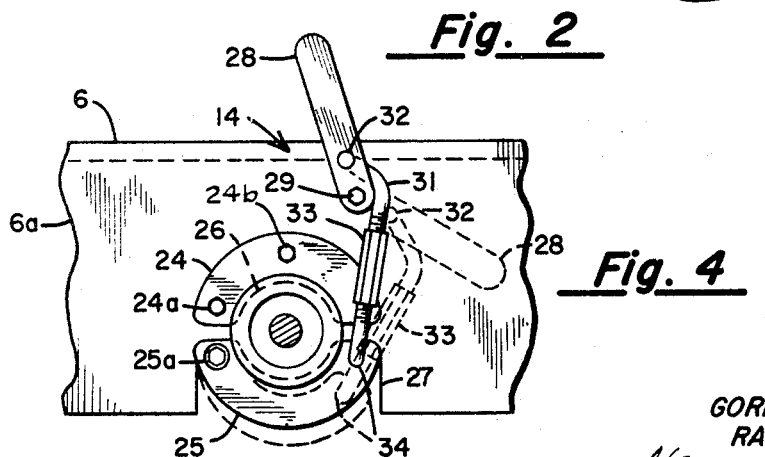
INVENTORS
GORDON E. KINDLIEN
RAYMOND C. ROTHI

3,439,747
AERATING AND CULTIVATING APPARATUS
Gordon E. Kindlien, White Bear Lake, and Raymond C. Rothi, St. Paul, Minn., assignors to Ryan Equipment Company, St. Paul, Minn., a corporation of Minnesota
Filed Mar. 31, 1966, Ser. No. 539,142
Int. Cl. A01b 33/02, 45/02; A01d 55/18
U.S. Cl. 172—42                                  7 Claims

ABSTRACT OF THE DISCLOSURE

An apparatus having manually operable clamp means for quickly releasing and clamping a reel on a turf working machine.

---

This invention relates to apparatus for working soil, turf and the like, and particularly to improvements in apparatus for aerating the turf of golf courses, bowling greens, golf greens and lawns generally where it is beneficial to cut through root growth and perforate the turf periodically to aerate and facilitate the penetration of fertilizers and water.

Such apparatus embodies a horizontally extending rotary shaft from which the blades or other tools for penetrating the turf radiate. The assembly of the shaft and tools, generally called the reel in the industry, is made interchangeable with other reels carrying various types of tools which are variously spaced along the shaft. Each reel must be power-driven and has fixed on its shaft a pulley, sprocket wheel or other driving means adapted to be driven by suitable connections with a motor, usually of the internal combustion type.

Heretofore, the reel shaft has had bearing cages formed with flanges which have been secured by bolts to a housing for the reel or to a frame support. To remove the reel from the housing it has been necessary to remove the bolts fastening the reel in operative position. This operation has involved considerable labor and is time-consuming because such reels are designed to do heavy work, are usually provided in lengths of two to three feet, resulting in a reel assembly weight on the order of one hundred pounds. It will be evident that the replacement of one reel by another designed for use in performing another aerating or cultivating operation is similarly tedious.

An object of our invention is to greatly facilitate the operation of changing reels in apparatus of the class described.

A further object is to provide readily accessible mechanism for detachably fastening the bearings for a reel of the class described to the frame or housing of a supporting carriage.

A particular object is to provide reel fastening mechanism comprising a manually operable clamp mounted adjacent to each end of the reel shaft for engagement with bearing cages adapted to interlock with the clamp to selectively retain the reel assembly on its supporting carriage or release the reel when an interchange of reels is to be made.

Other objects will appear and be more fully pointed out in the following specification and claims.

In the drawing:

FIG. 1 is a perspective view showing our improved reel fastening mechanism mounted on a four-wheel carriage and including an internal combustion engine of common type mouneted on the carriage;

FIG. 2 is a horizontal sectional view taken along the axis of the reel shaft showing our improved fastening mechanism;

FIG. 3 is a fragmentary vertical section showing an end portion of the reel, taken on the line 3—3 of FIG. 2; and FIG. 4 is an end view of our apparatus with the driving mechanism or pulley removed from the end of the reel shaft.

Referring to FIG. 1 of the drawing, our improved aerating and cultivating apparatus is shown mounted on a carriage having a housing 6 supported on four wheels 7 and having secured to the upper deck of the housing an internal combustion engine 8. A handle 9 of common type is shown connected to the housing 6 and a reel 10 has blades 11 mounted thereon as hereinafter more fully described.

In FIG. 2 a series of aerating blades 11 are shown spaced along the shaft 12 by tubular spacers and the spacers and blades are shown confined on the shaft 12 by threaded lock nuts 16. The central portion of the shaft is preferably of noncircular cross-sectional shape, for example hexagonal or square shape, so that the blades 11 may be adjustable along the shaft while making driving engagement therewith. Reduced end portions of the shaft 12 fit in antifriction bearings 17, 17a and the latter are confined in the bearing cages 13, 13a. At least one of these cages 13a and its bearing 17a are formed to make the shaft 12 self-aligning in its bearings.

As further shown in FIG. 1, clamp mechanism, indicated generally by the numeral 14, is provided to removably fasten the bearing cages in place. Fixed on one end of the shaft 12 is a pulley 19 for driving the shaft (FIGS. 2 and 3). Suitable linkage between the pulley 19 and the driving shaft of the motor 8, as shown in FIG. 1, may comprise a belt of V-type indicated at 20, a pulley 21 which is motor driven and a clutch indicated generally at 22, adapted to be operated by a manual lever 23 to control the driving of the reel. The carriage shown in FIG. 1 may be propelled manually by the use of the handle 9, but power drive connections with the motor 8, of any known or suitable type may be provided for work requiring more traction power.

Our clamp mechanism is shown in detail in FIGS. 2, 3 and 4. This mechanism, indicated generally by the numeral 14, has arcuate clamp jaws 24 and 25. Arcuate clamp jaw 24 is rigidly connected to an end wall 6a through a bolt 24a and a bolt 24b. Arcuate clamp jaw 25 is pivotally connected to a bolt 24a and a bolt 24b by pivot bolt 25a to end wall 6a of the housing 6 (FIG. 4). Bearing cage 13a is formed with a peripheral groove 26 disposed to receive the inner margins of the clamp jaws 24 and 25. A downwardly open recess 27 is formed in each of the end walls 6a of the housing to permit the reel as a unit to drop out of the housing when the clamp jaws are moved to open position.

Operating mechanism for each pair of the clamp jaws comprises a manually operable lever 28 which is pivoted on a bolt 29 threaded in a boss 30 projecting from an end wall of the housing (FIG. 3). A link indicated generally by the numeral 31 is formed with an outwardly bent upper end portion 32, fitting in a perforation in the lever 28, a central turnbuckle portion 33, and an inwardly bent end portion 34 of the link which fits in an opening in the lower clamp jaw 25. As shown in FIG. 2, the bearing cage 13 at the left end of the shaft 12 is formed with an annular flange 36 for engagement with the inner side of the clamp jaw 24 and has an elongated cylindrical surface 37 for engagement with the inner peripheries of the clamp jaws, in place of the annular groove 26 at the opposite or driven end of the shaft 12. Otherwise the clamp mechanism, consisting of the manual lever 28, link members 31, 32, 33 and 34 are duplicated at the ends 6a of the housing. The turnbuckle portions 33 provide accurate adjustment of the effective length of the link 31.

This clamp release mechanism is movable from the position shown in full lines in FIGS. 3 and 4 to that shown in broken lines in FIG. 4. Thus when in the locking or full line position the link member 32 is positioned to the left of the center of the lever pivot bolt 29 for the lever 28 so the clamp jaws are locked in the operative position. To release the reel as a unit it is only necessary to operate the levers 28 toward the right past the center of the pivot 29 as shown in broken lines in FIG. 4 and then to withdraw the end 34 of the link from the opening in lower jaw 25. This allows the jaws 25 to swing out of the path of the reel assembly while the latter drops to the ground. A substitute reel may be inserted and fastened in the housing quickly and easily by lifting the reel ends in the embrace of the clamp jaws and locking them in their operating position by manipulating the levers 28. The groove 26 provides projections at the inner and outer sides of the clamp levers 24 and 25 to prevent movement of the cage 13a in either direction longitudinally of the shaft 12. Where the self aligning feature is not needed for the shaft, simple, projecting lugs adjacent to one side or the other of the clamp jaws may be provided on the bearing cage, or a projection such as the flange 36 on the bearing 13 may be provided.

We claim:

1. Apparatus for working soil, turf and the like comprising: an elongated rotary shaft; a series of blades spaced along and secured to said shaft for penetrating soil or turf; a frame; bearings for supporting said shaft on said frame; means for transmitting power to said shaft for rotating the same; a bearing cage interposed between each of said bearings and said frame, said bearing cages having outer peripheral projections and manually operable clamp means supported on said frame and engaging the outer surfaces of said bearing cages adjacent to said projections for removably securing said shaft and said bearing cages to said frame, said manually operable clamp means having a pair of clamp jaws, one of said clamp jaws pivotally mounted to said frame, said pair of clamp jaws formed to engage the peripheries of said bearing cages at opposite sides thereof; and means for locking said clamping means in engagement with the peripheries of said bearing cages.

2. Apparatus in accordance with claim 1 in which said shaft has an end portion projecting outwardly from a bearing and cage therefor, said means for transmitting power to said shaft being secured to said projecting end portion of said shaft.

3. Apparatus for working soil, turf and the like according to claim 1 in which said blades slidably fit said shaft, spacers separate said blades, and in which means are provided for confining said blades and spacers on said shaft.

4. Apparatus in accordance with claim 1 in which said means for locking said clamping jaws in engagement with said bearing cages comprise a manually operable lever pivotally supported on said frame and connected to one of said clamp jaws at a point offset from said pivotal support, and a link joining said manually operable lever to the other of said clamp jaws whereby said manual lever is operable to selectively engage said clamp jaws with said bearing cages and to disengage them therefrom.

5. Apparatus in accordance with claim 4 wherein said link comprises screw thread means for adjusting the effective length thereof, and an end portion of the link adapted to be detached from said other of said clamp jaws adjacent to its end remote from its pivotal support on said frame.

6. Apparatus in accordance with claim 4 in which the pivotal connection between said manually operable lever and said one of said clamp jaws is movable from a locking position at one side of the pivotal support for said manually operable lever on the frame to a release position at the other side of said pivotal support.

7. Apparatus in accordance with claim 1 in which a first one of said bearing cages is formed with an annular groove in its outer periphery to afford projections for engagement with opposite sides of said clamp means, and said first cage and the bearing confined therein have interengaging spherical surfaces whereby the angle of said shaft is adjustable for alignment with a second bearing for said shaft.

References Cited

UNITED STATES PATENTS

| | | | |
|---|---|---|---|
| 2,209,029 | 7/1940 | Kreigbaum et al. | |
| 2,400,204 | 5/1946 | Lindskog | 172—42 X |
| 2,722,795 | 11/1955 | Warner | 56—249 |
| 3,127,708 | 4/1964 | Burt | 308—24 X |
| 3,140,677 | 7/1964 | Fraser | 172—42 X |

ABRAHAM G. STONE, *Primary Examiner.*

S. C. PELLEGRINO, *Assistant Examiner.*

U.S. Cl. X.R.

172—21; 56—249.5; 308—24